US005727072A

United States Patent [19]

Raman

[11] Patent Number: 5,727,072

[45] Date of Patent: Mar. 10, 1998

[54] USE OF NOISE SEGMENTATION FOR NOISE CANCELLATION

[75] Inventor: Vijay Rangan Raman, Greenwich, Conn.

[73] Assignee: Nynex Science & Technology, White Plains, N.Y.

[21] Appl. No.: 393,800

[22] Filed: Feb. 24, 1995

[51] Int. Cl.[6] .................................................... H04B 15/00

[52] U.S. Cl. ...................... 381/94.2; 395/2.35; 395/2.36; 395/2.37; 395/2.42

[58] Field of Search .............................. 381/94; 395/2.35, 395/2.36, 2.37, 2.42

[56] References Cited

U.S. PATENT DOCUMENTS 4,979,214 12/1990 Hamilton .
5,293,588 3/1994 Satoh et al. ............................ 395/2.42

OTHER PUBLICATIONS

Noise adaptation in a hidden Markov model speech recognition system. "Computer Speech & Language"—Dirk Van Compernolle 1989—pp. 151–167.

Environmental Robustness In Automatic Speech Recognition Alejandro Acero and Richard M. Stern pp. 849–852 Dept. of Elec. & Comp. Engineering & School of Comp. Science Carnagie Mellon University.

Robust Word Setting in Adverse Car Environments pp. 1045–1048 Satoshi Nakamura, Toshio Akabane, Seiji Hamaguchi Sharp Corp—Japan.

IEEE Transactions on Speech & Audio Processing vol. 1—No. 1 Jan. '93 "Energy Conditioned Spectral Estimation for Recognition of Noisy Speech" Adoram Erell, Mitch Weintraub pp. 84–89.

IEEE Transactions on Acoustics, Speech, and Signal Processing—vol. ASSP-27 No. 2—Apr. '79—"Suppression of Acoustic Noise in Speech Using Special Subtraction" Steven Boll pp. 113–120.

"Experiments On Noise Reduction Techniques With Robust Voice Detector In Car Environments" A. Brancaccio and C. Pelaez Alcatel Italia, FACE Division Research Center pp. 1259–1262.

"Automatic Word Recognition in Cars"Chafic Mokbel and Gerard Chollet.

*Primary Examiner*—Forester W. Isen
*Attorney, Agent, or Firm*—Loren C. Swingle; Michaelson & Wallace

[57] ABSTRACT

What is disclosed is a method and system for improving noise cancellation in a signal containing speech by classifying noise frames by their characteristics, and estimating noise based on only one classification at a time. In some instances, the disclosed method further directs the noise estimator and noise canceller to utilize only a designated noise class. Also, the disclosed system can automatically switch between pre-processing and post-processing modes in response to detected changes in acoustic environments.

30 Claims, 9 Drawing Sheets

(TYPICAL EXISTING SYSTEM)

USE OF NOISE SEGMENTATION FOR NOISE CANCELLATION

FIELD OF THE INVENTION

The present invention relates in general to communications systems, and more particularly to methods for reducing noise in voice communications systems.

BACKGROUND OF THE INVENTION

Background noise during speech can degrade voice communications. The listener might not be able to understand what is being transmitted, and is aggravated by trying to identify and interpret speech while noise is present. Also, in speech recognition systems, errors occur more frequently as the level of background (or ambient) noise increases.

Substantial efforts have been made to reduce the level of ambient noise in communications systems on a real-time basis. One is to filter out the low and high bands at the extremes of the voice band. The problem with this is that much noise is located in the same frequencies as usable speech.

Another is to actively estimate the noise and filter it out of the associated speech. This is generally done by quantifying the signal when speech is not present (presumed to be representative of ambient noise), and subtracting out that signal during speech. If the ambient noise is consistent between periods of speech and periods of non-speech, then such cancellation techniques can be very effective.

A typical state-of-the-art noise cancellation (speech enhancement) system generally has three components:

Speech/Noise Detector

Noise Estimator

Noise Canceller

A standard speech enhancement system might typically operate as follows:

The input signal is sampled and converted to digital values, called "samples". These samples are grouped into "frames" whose duration is typically in the range of 10 to 30 milliseconds each. An energy value is then computed for each such frame of the input signal.

A typical state-of-the-art Speech/Noise Detector is often implemented via a software implementation on a general purpose computer. The system can be implemented to operate on incoming frames of data by classifying each input frame as ambient noise if the frame energy is below an energy threshold, or as speech if the frame energy is above the threshold. An alternative would be to analyze the individual frequency components of the signal in relation to a template of noise components. Other variations of the above scheme are also known, and may be implemented.

The Speech/Noise Detector is initialized by setting the threshold to some pre-set value (usually based on a history of empirically observed energy levels of representative speech and ambient noise). During operation, as the frames are classified, the threshold can be adjusted to reflect the incoming frames, thereby creating a better discrimination between speech and noise.

A typical state-of-the-art Noise Estimator is then utilized to form a quantitative estimate of the signal characteristics of the frame (typically described by its frequency components). This noise estimate is also initialized at the beginning of the input signal and then updated continuously during operation as more noise signals are received. If a frame is classified as noise by the Speech/Noise Detector, that frame is used to update the running estimate of noise.

Typically, the more recent frames of noise received are given greater weight in the computation of the noise estimate than older, "stale" noise frames.

The Noise Canceller component of the system takes the estimate of the noise from the Noise Estimator, and subtracts it from the signal. A state-of-the-art cancellation method is that of "spectral subtraction", where the subtraction is performed on the frequency components of the signal. This may be accomplished using either linear or non-linear means.

Effectiveness of the overall noise-cancellation system in enhancing the signal, i.e. enhancing the speech, is critically dependent on the noise estimate; a poor or inappropriate estimate will result in the benign error of negligible enhancement, or the malign error of degradation of the speech.

Existing noise reduction systems realize a degradation in performance when there are two or more types of ambient noise, but only one type is representative of ambient noise during speech (target noise). In such a situation, state-of-the-art systems average these noise types together, and perform noise cancellation based on the average, which is not representative of target noise. Alternatively, existing systems would gradually replace the noise estimate of an earlier type with the more recently observed type, even though the earlier type may be more representative of target noise.

Such situations may involve hands-free operations where squelch (noise suppression) is applied to the signal received at the microphone, until speech is detected. Squelch is applied to avoid an echo effect. When a system utilizes squelch technology, one type of noise is observed at the far end while squelch is activated, and another type when squelch is not activated. Only the latter type of noise is representative of ambient noise during speech (target noise).

Another problem occurs in situations involving dynamically directional microphones and voice-activated microphones. In each case, the ambient noise during speech will more closely approximate the noise immediately following speech than the noise immediately preceding speech. This is due to the fact that the environment picked up by microphones for input into the system changes radically once speech begins, but doesn't return to the initial state until some period of time following speech. Therefore, current systems would use the unrepresentative noise prior to speech to enhance the speech, resulting in poor performance.

Another problem situation occurs when a speaker moves the microphone (telephone mouthpiece) closer to the mouth as the speaker begins speaking. The changed spatial relationship between the microphone and the speaker's head causes an acoustical change in ambient noise entering the microphone. Only the noise present when the mouthpiece is close to the mouth is representative of target noise.

Another difficulty with present systems is the occurrence of transient noise (e.g., a cough or a slamming door). Current systems would automatically average the transient noise with the general ambient noise. This will tend to degrade the noise estimate.

Finally, some systems have the capability of noise-cancellation on a post-processing basis. This is accomplished by storing speech and then using an estimate of noise for cancellation purposes on the stored speech. Sometimes a post-processing arrangement can be worthwhile, but other times is unnecessary. Existing systems cannot automatically switch between the two in real-time, and therefore cannot handle situations where pre-processing is sometimes appropriate and post-processing is sometimes appropriate.

BRIEF DESCRIPTION OF THE INVENTION

The foregoing drawbacks are overcome by the present invention.

What is disclosed is a method and system of noise cancellation which can be used to provide effective speech enhancement in environments involving situations where there is more than one type of noise present.

An implementation of the method and system is briefly described as follows:

A standard noise cancellation system can be modified such that a speech/noise detector performs further analysis on incoming signal frames. This analysis would identify speech, stable noise, and "other", and would further classify stable noise into classes constructed from similar contiguous frames.

The detector (which is now a "classifier") informs a supervisory controller of its results. The supervisory controller then determines the class of noise which is most representative of target noise, and directs the noise estimator to calculate an estimate using only frames from that noise class as input.

Further, the controller may direct the canceller to access the stored signal, and re-perform its cancellation on the entire stored signal based on a noise estimate from a designated noise class.

DETAILED DESCRIPTION OF THE INVENTION

Figure 1:
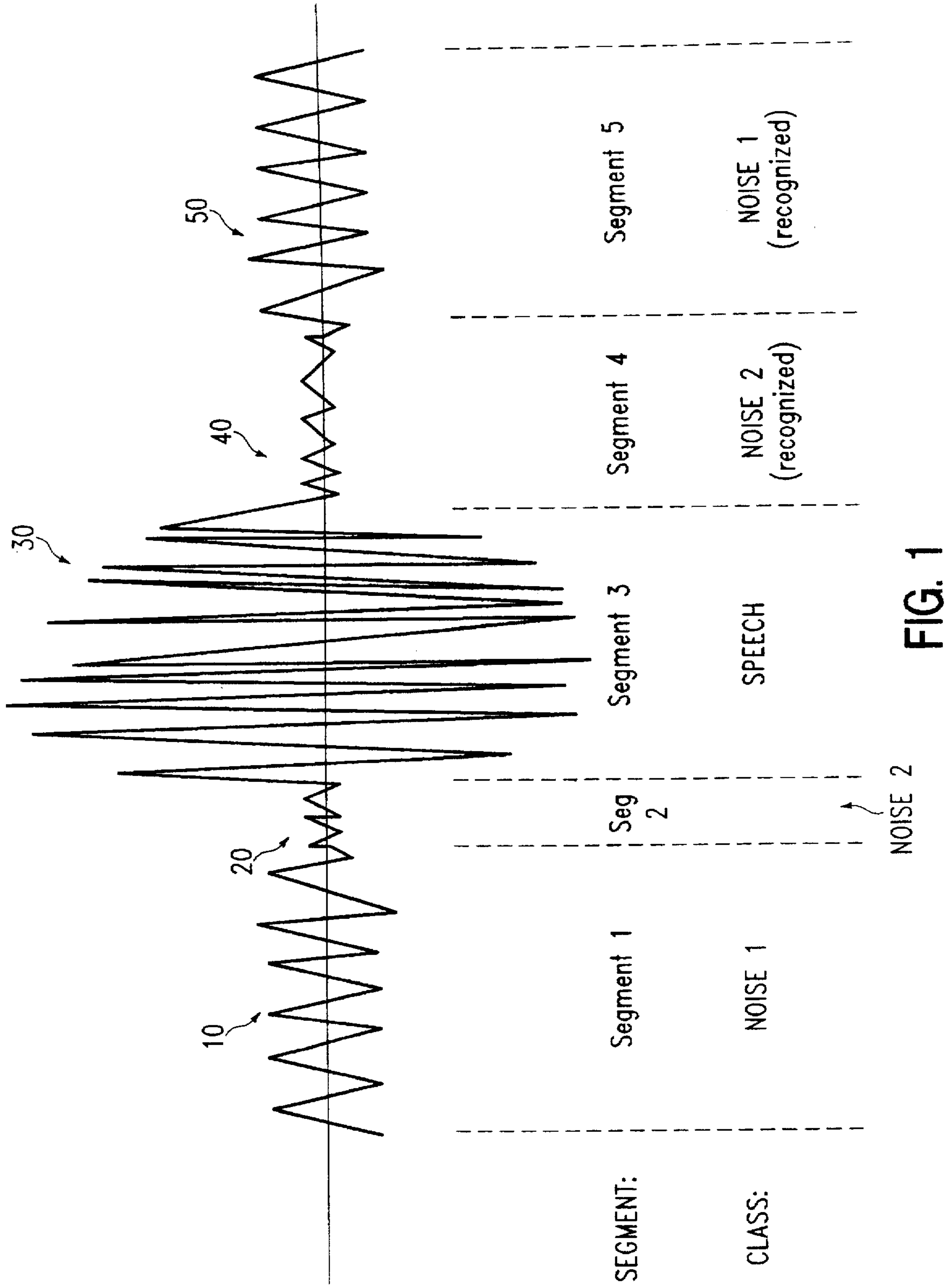
FIG. 1 represents a noise signal where the mouthpiece is changed in relationship to the mouth immediately prior to and subsequent to speech.

FIG. 1 depicts a signal which represents a person holding the microphone portion of a telephone (mouthpiece) away from their mouth, then bringing the mouthpiece close to the mouth immediately prior to speech, and then shortly after speech moving the mouthpiece away. Such a situation can cause two different levels of ambient noise. Segment 1 (signal 10) represents ambient noise when the mouthpiece is not close to the mouth. Signal 20 represents ambient noise with the mouthpiece close to the mouth. Signal 30 represents speech. Signal 40 is similar to Signal 20, representing ambient noise with the mouthpiece close to the mouth. Signal 50 is similar to Signal 10, wherein the mouthpiece is held away from the mouth.

In this circumstance, a typical noise enhancer would generate an estimate of noise based on Signal 10, and slightly modify it during Signal 20. This modified noise capture would be used to cancel the noise during the speech in Signal 30. A more effective noise cancellation procedure would be to use Signal 20 as the sole basis of an estimate of ambient noise during speech, and cancel that noise estimate from Signal 30 (speech).

Figure 2:
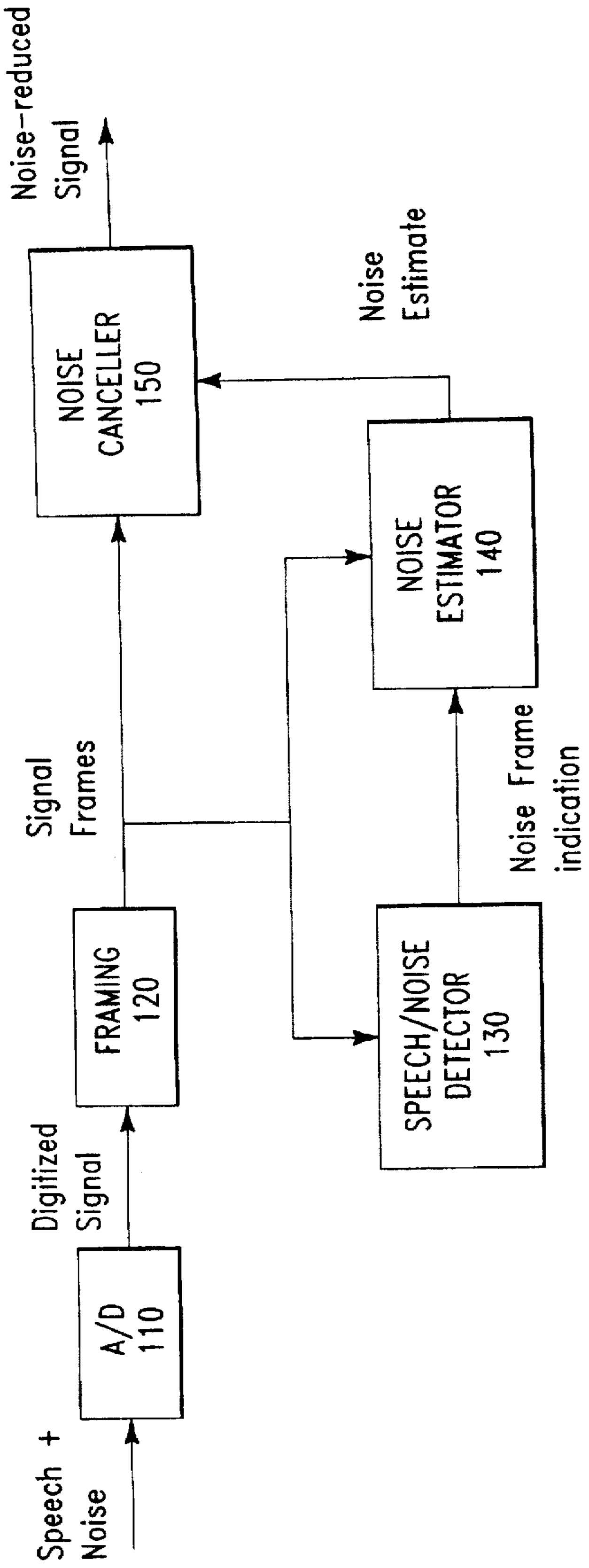
FIG. 2 is a block diagram of a typical existing noise reduction system.

FIG. 2 depicts a typical, real-time noise cancellation system. The audio signal enters analog/digital converter (A/D 110) where the analog signal is digitized. The digitized signal output of A/D 110 is then divided into individual frames within framing 120. The resultant signal frames are then simultaneously inputted into noise canceller 150, speech/noise detector 130, and noise estimator 140.

When speech/noise detector 130 determines that a frame is noise, it signals noise estimator 140 that the frame should be input into the noise estimate algorithm. Noise estimator 140 then characterizes the noise in the designated frame, such as by a quantitative estimate of its frequency components. This estimate is then averaged with subsequently received frames of "speechless noise", typically with a gradually lessening weighting for older frames as more recent frames are received (as the earlier frame estimates become "stale"). In this way, noise estimator 140 continuously calculates an estimate of noise characteristics.

Noise estimator 140 continuously inputs its most recent noise estimate into noise canceller 150. Noise canceller 150 then continuously subtracts the estimated noise characteristics from the characteristics of the signal frames received from framing 120, resulting in the output of a noise-reduced signal.

Speech/noise detector 130 is often designed such that its energy threshold amount separating speech from noise is continuously updated as actual signal frames are received, so that the threshold can more accurately predict the boundary between speech and non-speech in the actual signal frames being received from framing 120. This can be accomplished by updating the threshold from input frames classified as noise only, or by updating the threshold from frames identified as either speech or noise.

Figure 3:
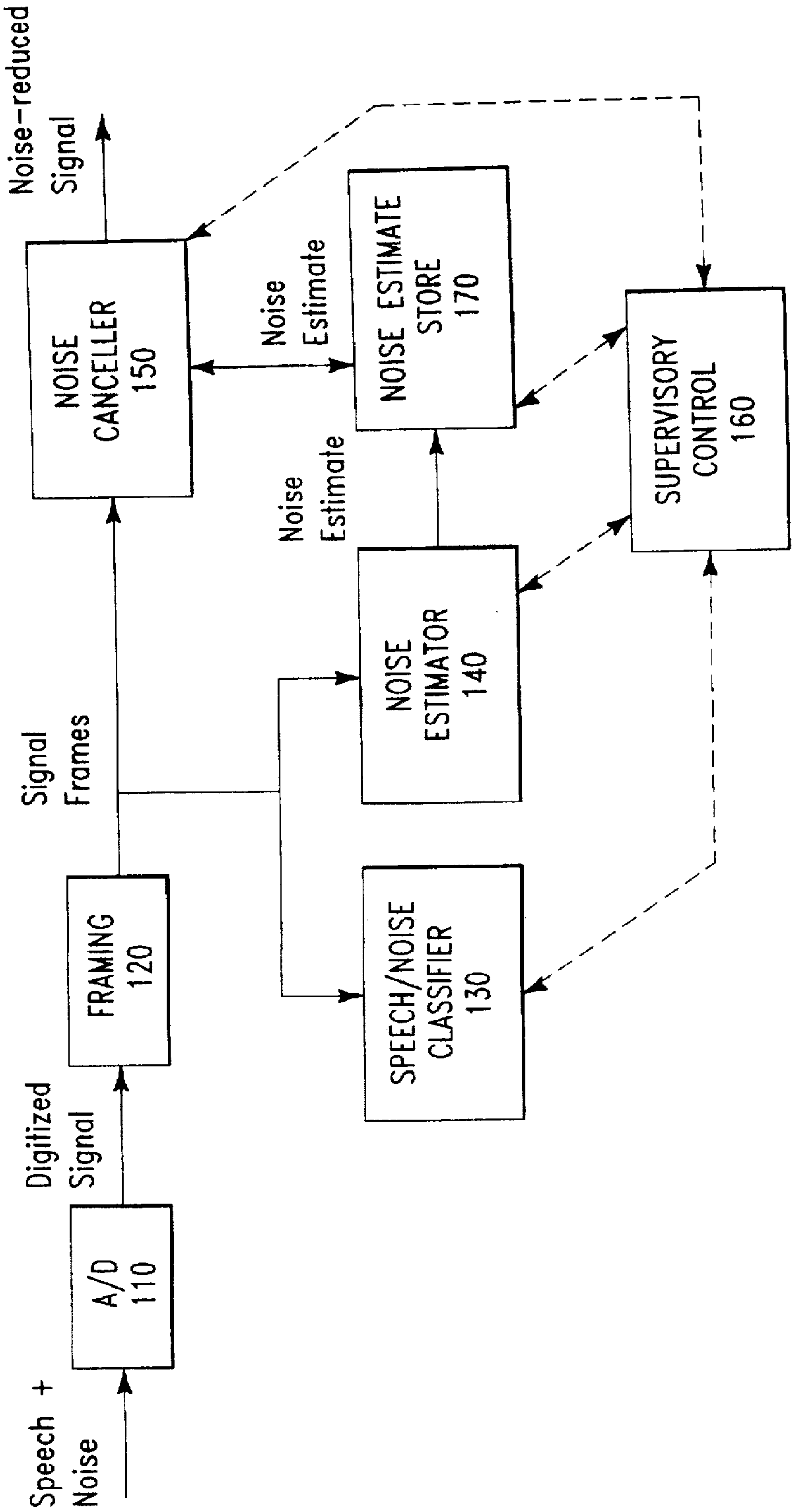
FIG. 3 is a block diagram of the inventive noise reduction system.

FIG. 3 represents the inventive change to a typical noise enhancement system. Speech/noise detector 130 (of FIG. 2) has been replaced by speech/noise classifier 130. Also, noise estimate store 170 is interposed between noise estimator 140 and noise canceller 150. Supervisory control 160 controls the activity of noise estimator 140, noise estimate store 170, and noise canceller 150 upon receiving input from speech/noise classifier 130 and analyzing the input.

Figure 4:
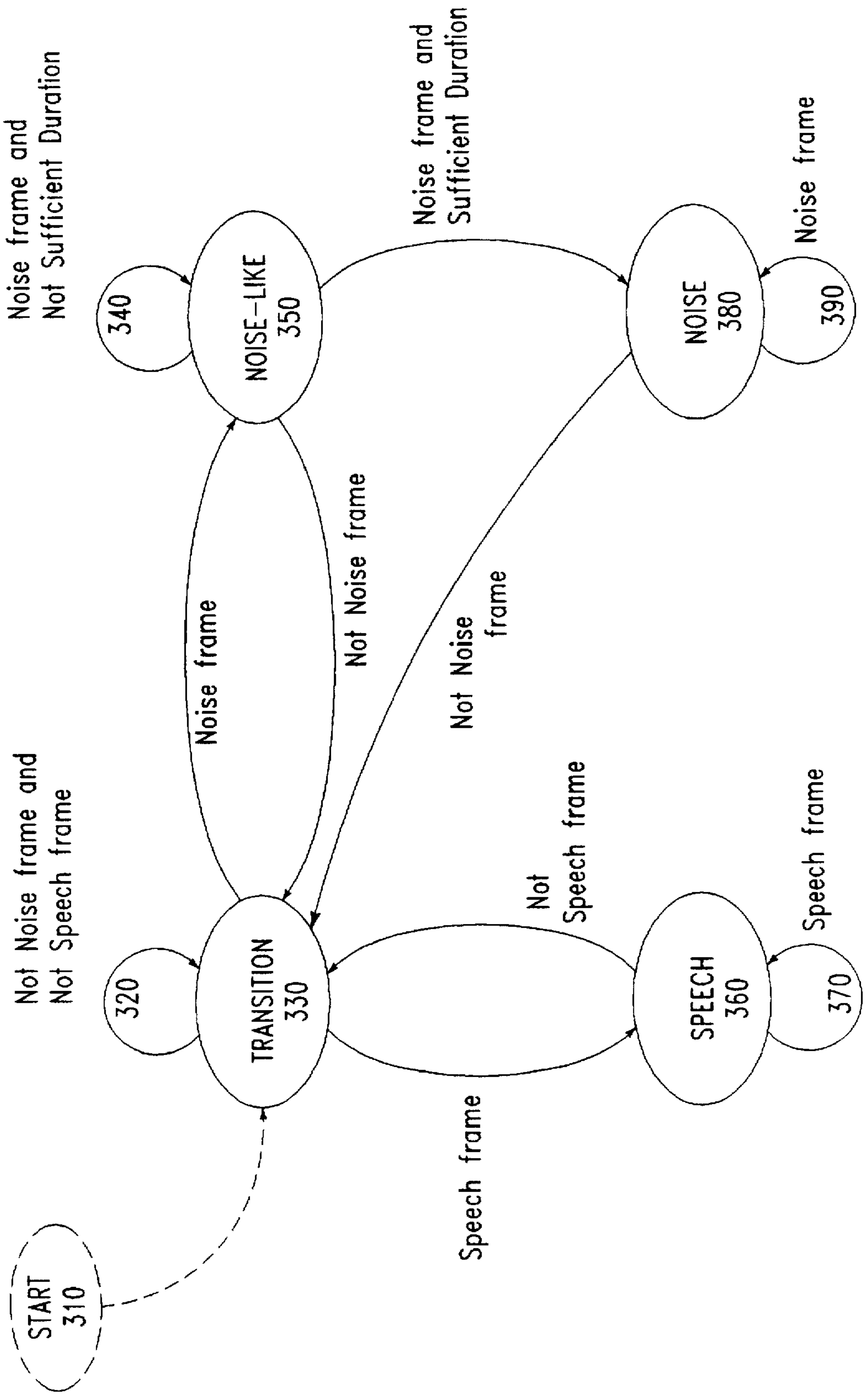
FIG. 4 is a state transition diagram of the speech/noise classifier 130.

FIG. 4 is a state transition diagram of speech/noise classifier 130. When speech/noise classifier 130 receives an initial signal frame, it invokes state 330 which analyzes the frame to see if it is classified as noise or speech, or neither. If the classification is speech, then the state shifts to 360. Otherwise, loop 320 is entered until either two consistent noise frames in a row are detected, in which case the state changes to 350, or a speech frame is detected, and the state changes to 360.

When speech/noise classifier 130 is in state 350, loop 340 represents the analysis of incoming noise frames. If an incoming frame is not classified as noise, the state reverts to the transitional state, 330. If a sufficient number of consecutive frames (advantageously 3) are analyzed in loop 340, and following an analysis to determine that a consistent noise pattern is present (for example, they have a similar energy level), slate 350 changes to state 380, indicating that a class of noise has been detected. It should be noted that the number of frames of noise required for "noise detection" is dependent on the size of the frame. For instance, using a frame size of 256 samples might be conducive to Fourier transform calculations. This size frame would equate to 32 milliseconds frame duration. Since approximately 100 milliseconds of sampling of noise is required to define "stable noise", 3 frames are required if 32 millisecond frames are used.

Once in state 380, subsequent incoming signal frames are analyzed in loop 390 to see if the same general noise parameters are present (i.e., the subsequent frames are of the same class), and if so the state remains at 380. If an incoming frame does not match the current noise classification, the state reverts to transition 330.

When speech/noise classifier 130 from FIG. 3 is in state 360, loop 370 represents the analysis of subsequent incoming signal frames to see if they still represent speech. If so, state 360 is maintained. If not, the state returns to transition 330.

Figure 5:
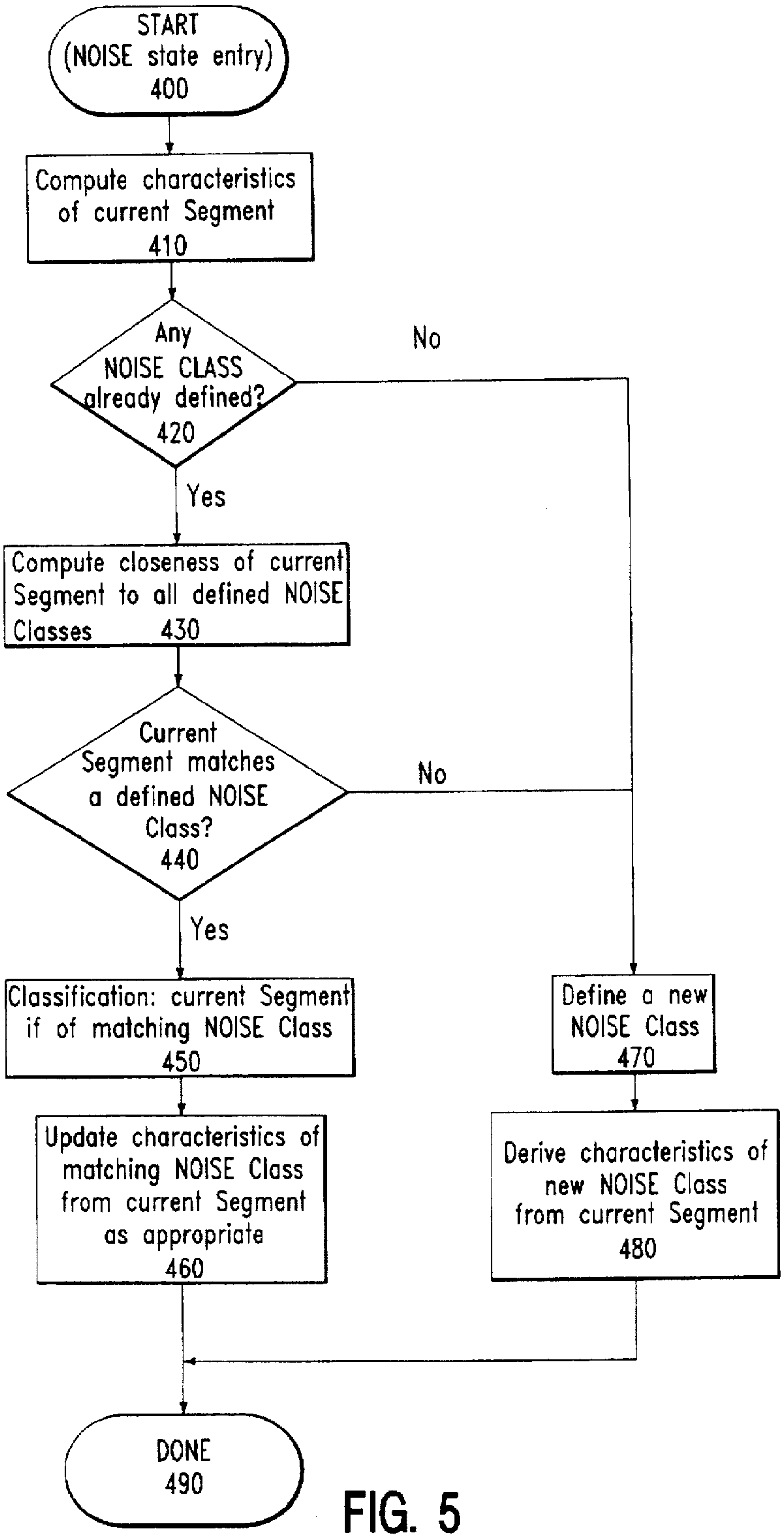
FIG. 5 is a flow chart of the operation of speech/noise classifier 130 when a consistent pattern of noise is detected.

FIG. 5 is a flow chart which more particularly delineates the steps taken upon entering noise state 380 of FIG. 4. Block 400 indicates that speech/noise classifier 130 has just entered noise state 380. At this point, speech/noise classifier 130 in block 410 would compute the characteristics of the current segment (a grouping of 3 frames which has been classified in state 350 as being of one noise class). Next, in block 420, speech/noise classifier 130 would determine if any noise class has previously been defined. If not, block 470 is invoked, wherein speech/noise classifier 130 would define a new noise class, and block 480 indicates that speech/noise classifier 130 would derive characteristics of the new noise class from the current segment.

Returning to block 420, if a previous class has been defined by speech/noise classifier 130, then in block 430 speech/noise classifier 130 would compute how close the current segment is to any defined noise class. Next, in block 440, if there was no match with an existing noise class, block 470 would be implemented, wherein speech/noise classifier 130 would define a new class, and block 480 would derive characteristics of that new noise class from the current segment.

Returning to block 440, if the current segment did match an existing noise class, block 450 would be invoked, wherein speech/noise classifier 130 would attach that class designation to the segment, and than block 460 would update the characteristics of that noise class based on the current segment as input.

Once speech/noise classifier 130 has accomplished the noise classification, this information would be transferred to supervisory control 160. Also, speech/noise classifier 130 would continuously update supervisory control 160 as to its current state (transition, noise-like, noise, or speech).

Loop 390 analyzes subsequent frames after the current segment to see if they fall in the same class. If so, they are added to the current segment. If not, speech/noise classifier 130 reverts to transition state 330.

Figure 6:
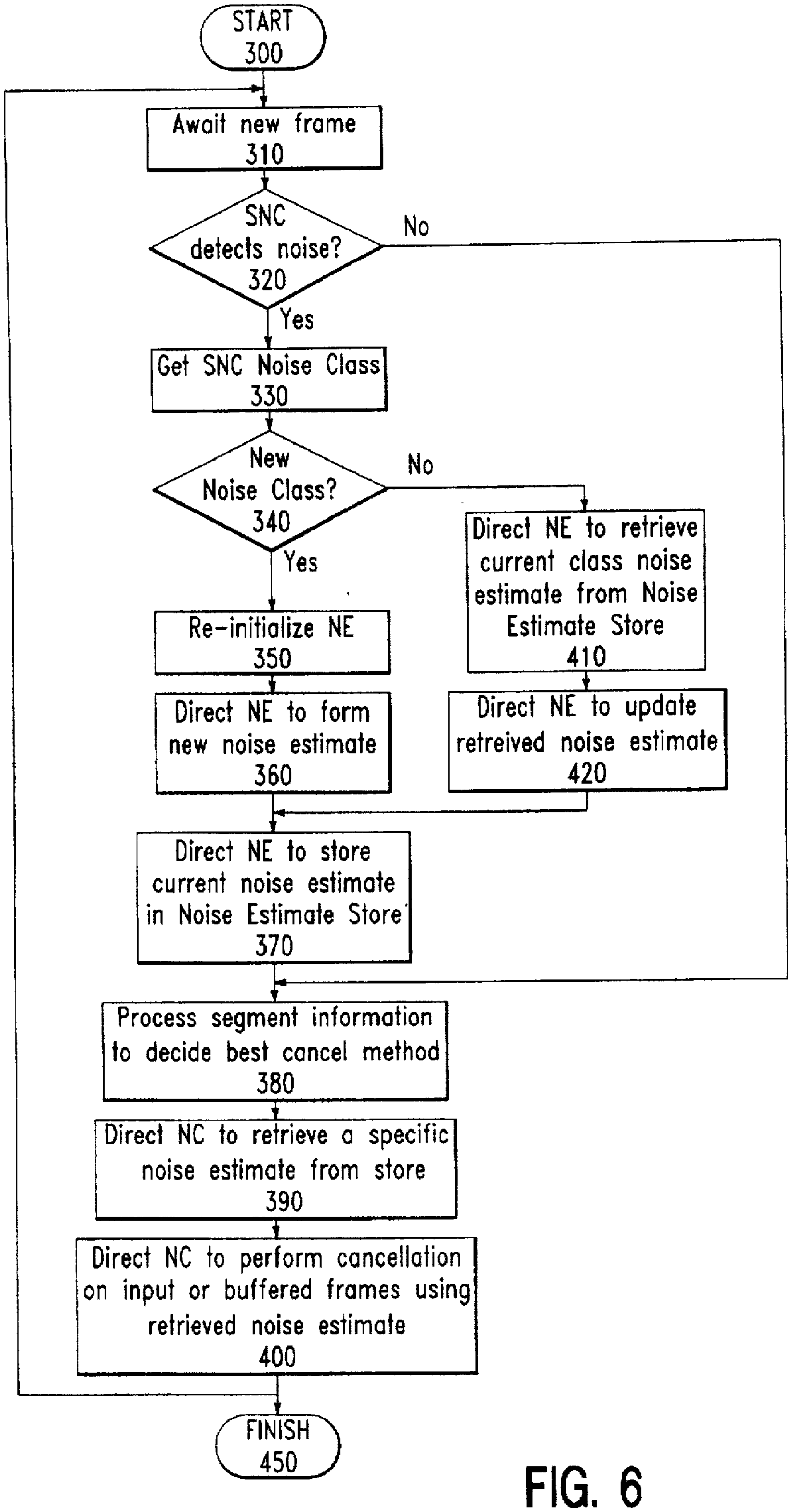
FIG. 6 is a flow chart of the operation of supervisory control 160.

FIG. 6 represents a flow chart of the operations of supervisory control 160. Referring simultaneously to FIGS. 3 and 6, when a new frame arrives from framing 120 (FIG. 3), block 310 is instituted, followed by block 320 which asks whether speech/noise classifier 130 has detected noise. If speech/noise classifier 130 does not detect noise, block 380 is instituted, wherein supervisory control 160 makes a determination as to the noise situation (described in more detail below).

Returning to block 320, if speech/noise classifier 130 has detected that the current frame represents noise, block 330 indicates that supervisory control 160 would receive the noise classification from speech/noise classifier 130. Next, block 340 would see if the noise class is new. If not, supervisory control 160 would direct noise estimator 140 to retrieve the current noise class estimate for that noise class from noise estimate store 170 (block 410), and then would direct noise estimator 140 to update the retrieved noise estimate (block 420). Next, supervisory control 160 would direct noise estimator 140 to store the current noise estimate in noise estimate store 170 in a location dedicated to that noise class, as shown in block 370.

Returning to block 340, if a new noise class is detected, supervisory control 160 would instruct noise estimator 140 to re-initialize (block 350), followed by a direction to noise estimator 140 to form a new noise estimate (block 360), followed by a direction by noise estimator 140 to store the current noise estimate in noise estimate store 170 (block 370).

Block 380 represents the processing which would determine what next step should be taken by the system based on an analysis of the physical environment generating the signal.

Figure 8:
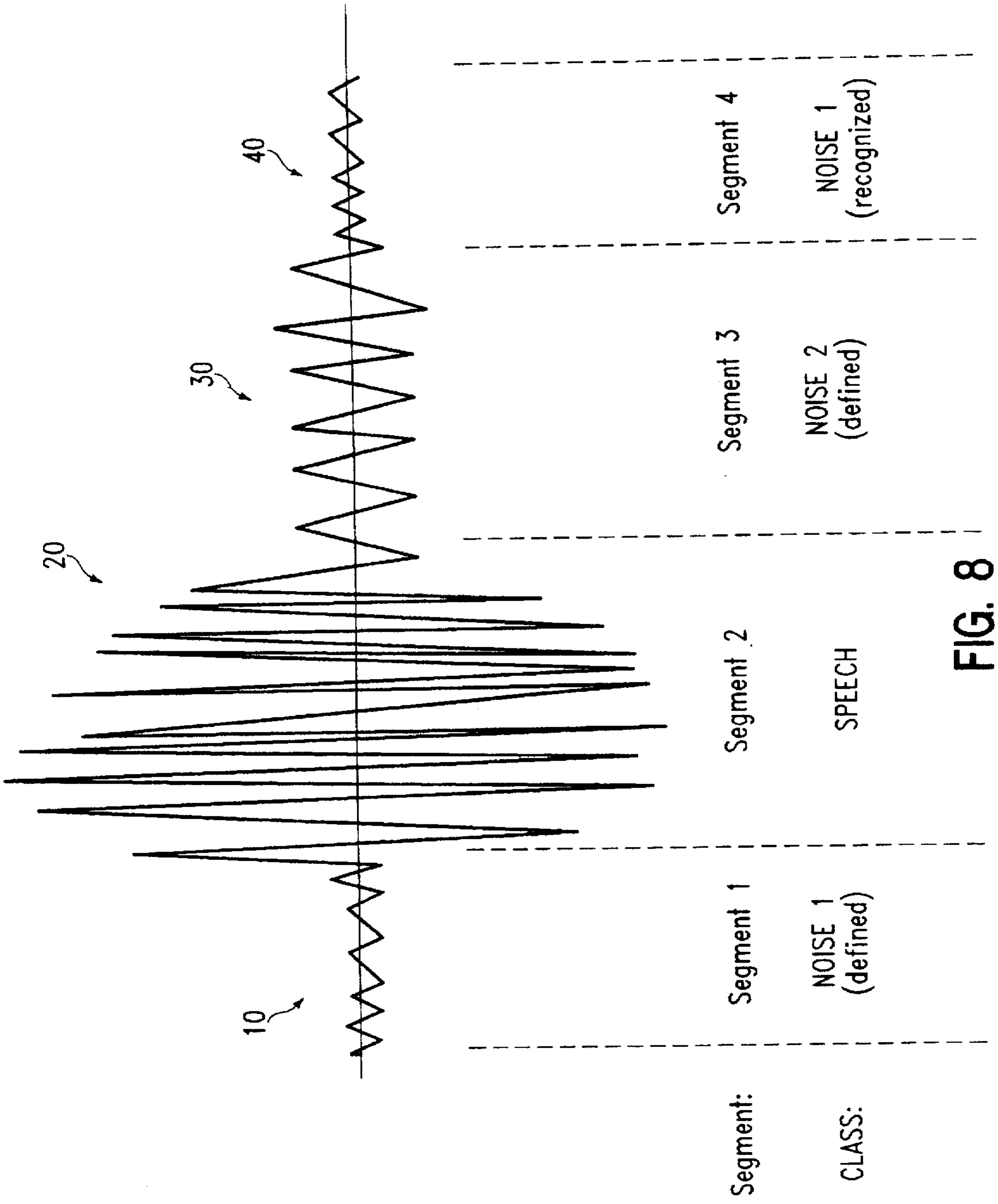
FIG. 8 is a depiction of a signal where squelch is present immediately prior to speech.

For instance, turning briefly to FIG. 8, this signal is representative of a hands free (squelch) situation. In this situation, when squelch is activated, such as in signal 10 (segment 1), there is a low level noise received (generally representative of line noise). Once speech begins in signal 20 (segment 2), squelch cuts out, and normal ambient noise is mixed in with the speech. Signal 30, immediately following speech, represents a continuation of this ambient, or target, noise which is evident until squelch kicks back in at signal 40 (segment 4). Block 380 could be readily programmed to identify the existence of a squelch situation. Supervisory control 160 can readily be programmed to detect speech onset by monitoring the speech state of speech/noise classifier 130. If the speech state remains for 3 or more frames, speech onset can be noted.

Another instance where the noise following speech is more representative of target noise is the dynamically directional or voice-activated microphone situation. If block 380 recognizes that the noise class immediately following speech is different from the class immediately prior to speech, it can be programmed to use the post-speech noise for estimation purposes.

In many situations, the noise immediately preceding speech is representative of target noise, and an estimate of such speech is typically available in a real-time system to begin canceling noise appropriately at the initiation of speech. However, in other cases, the noise immediately following speech is more representative of target noise (hands-free and dynamic or voice-activated mikes).

Therefore, in a real time (non-buffered) situation, block 380 can be programmed to identify and/or verify whether a "post-speech target noise" situation is present. If not, the noise cancellation process previously described is allowed to continue. If a post-speech target noise situation does exit, block 380 can identify the class of noise following speech which is representative of target noise, and can therefore ensure that the estimate of this noise is updated when further frames of noise of this class are received, and that noise canceller 150 only uses this class of noise for cancellation purposes.

Figure 7:
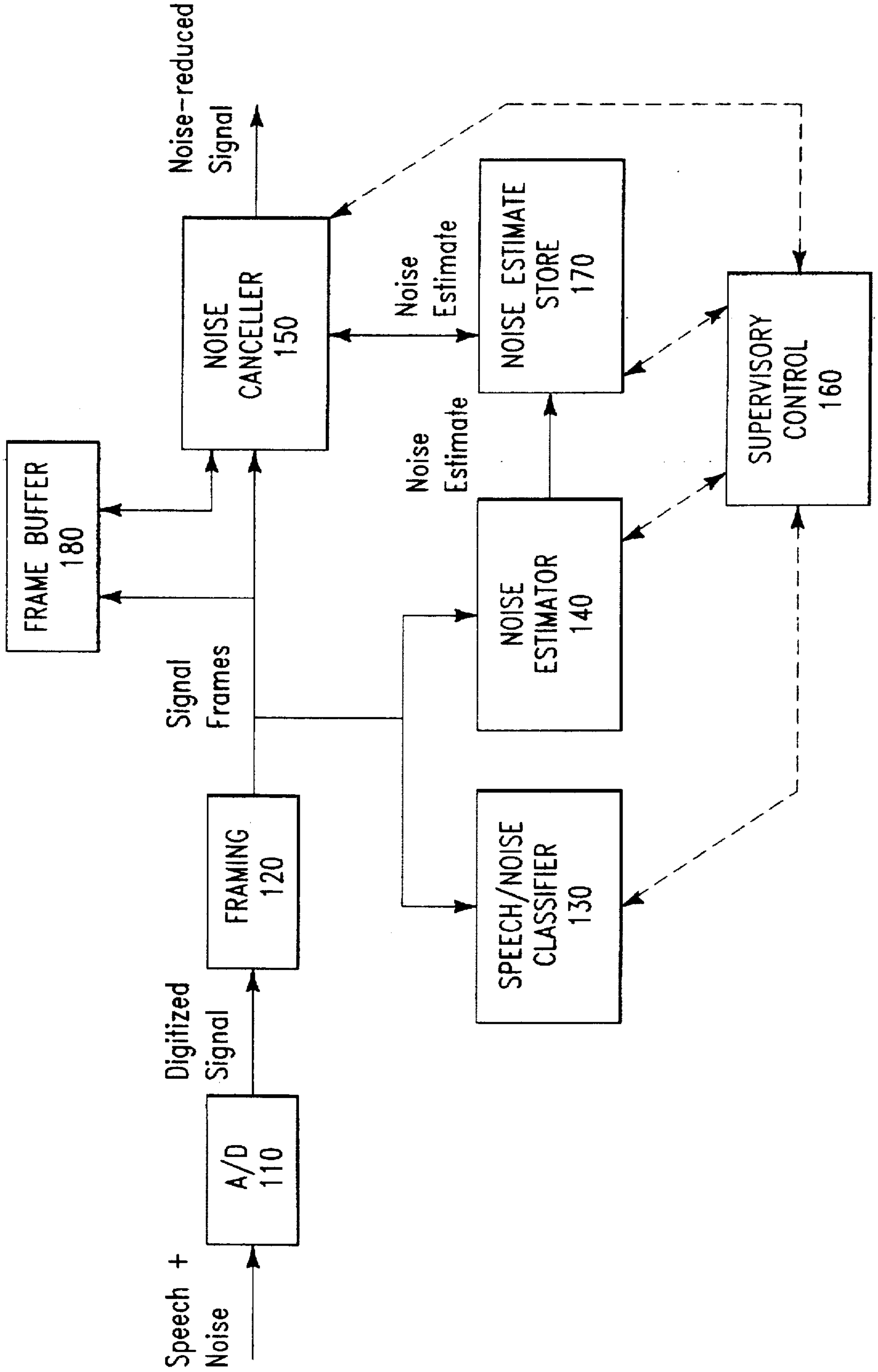
FIG. 7 is a block diagram of the inventive system with the addition of a frame buffer.

Alternatively, turning briefly to FIG. 7, block 380 of FIG. 6 can decide if noise canceller 150 should operate in a normal mode without reference to frame buffer 180 if a pre-speech target noise situation is determined. Conversely, if a post-speech target noise situation is determined at block 380 (FIG. 6), noise canceller 150 can be instructed to access frame buffer 180, which would contain all or a portion of the entire signal, and reprocess that entire signal using the appropriate estimate from the noise class representing target noise.

Post-processing situations might be appropriate in such circumstances as store-and-forward cases (such as voice messaging), or speech recognition/verification situations where the end user of the noise-reduced signal is a system which will identify a word or words, or to identify a speaker. Such circumstances will typically allow for varying amounts of delay.

Therefore, when frame buffer 180 is included in the system, block 380 (FIG. 6) can be used to determine automatically when it is appropriate to reprocess the signal based on a better noise estimate.

Returning to FIG. 6, block 390 indicates that supervisory control 160 (FIG. 3) would direct noise canceller 150 to retrieve a specific noise estimate from noise estimate store 170. Block 400 would then direct noise canceller 150 to perform noise cancellation on either the real-time input, or in appropriate circumstances, to access frame buffer 180 to again perform cancellation using the appropriate retrieved noise estimate as directed by block 390.

Figure 9:
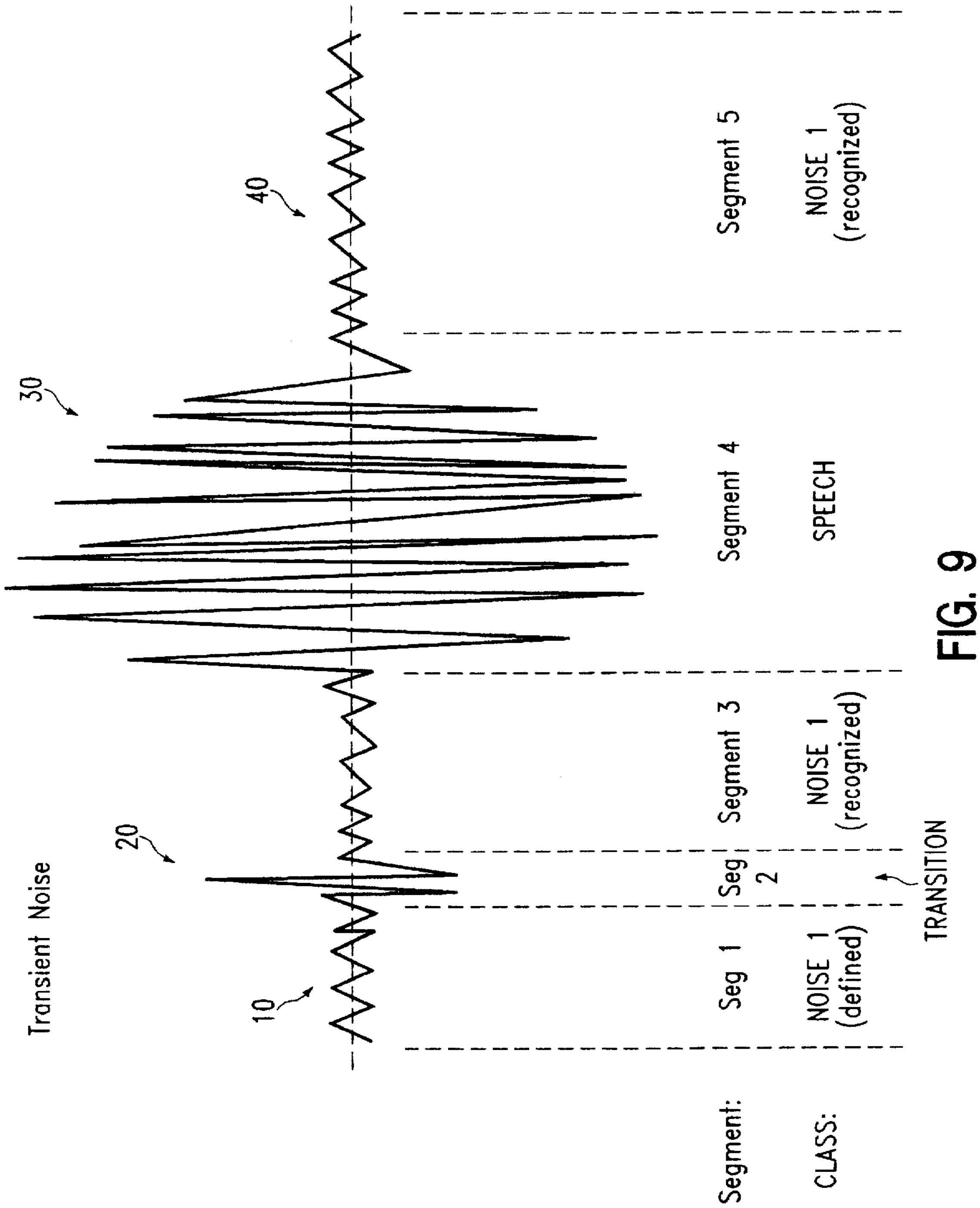
FIG. 9 is a depiction of a signal containing transient noise.

It should be noted that the invention without block 380 of FIG. 6 performs many new, useful functions when compared to existing systems. For instance, once noise is segregated into appropriate classes, noise estimator 140, operates only on noise of a single class, as opposed to existing systems which would average sequential noise frames together, even if they were in different classes. Also, turning briefly to FIG. 9, signal 20 (segment 2) represents a transient noise. Existing systems would average such transient noise with subsequent noise, and the noise estimate would be degraded thereby. In the instant invention, as seen in FIG. 4, transient noise would be seen in loop 320 if it was an extremely short duration, or in loop 340 if the duration were somewhat longer. In either event, the transient noise would not be classified as a segment of a class of noise and the state of speech/noise classifier 130 would not change to the "noise 380" state. In this way, the instant invention would automatically not include transient noise in its noise estimates.

Beyond automatically estimating only using a single class of noise, and not including transient noise in any estimates, block 380 of FIG. 6 can be utilized to perform more sophisticated analyses of the situation, resulting in better noise estimation and therefore better speech enhancement. Beyond the examples already discussed, block 380 can be readily programmed to verify the speech environment after it has been classified. For instance, if a squelch situation has been detected by block 380, block 380 can be readily programmed to further verify this conclusion by comparing squelch segments following speech with squelch segments prior to speech, and comparing non-squelch noise immediately following speech with other non-squelch noise immediately following other speech segments. Further, squelch noise would typically be at a lower energy level than non-squelch noise, which can be verified in block 380.

Finally, those with skill in the art can readily determine other parameters which block 380 can readily analyze once it has the classification data as determined by speech/noise classifier 130.

Even outside the specific task of speech enhancement, it may be useful to output from supervisory control 160 a categorization of the speech environment. For example, it may be useful for other signal-processing purposes, such as control of an acoustic echo-cancellation sub-system, to know whether or not the particular signal involves hands-free operation.

What is claimed is:

1. In a noise reduction system, a method for estimating noise for cancellation purposes comprising the steps of separating noise signal samples into frames, aggregating the frames into segments when adjoining frames are similar, ending a segment when a dissimilar frame is encountered, and using only one segment at a time as representative of noise during speech.

2. The method of claim 1 wherein only frames of similar energy levels are aggregated.

3. The method of claim 1 wherein a segment must contain at least three frames.

4. The method of claim 1 wherein noise frames not included in any segment are not used for noise estimation.

5. The method of claim 1 wherein the last segment prior to speech is solely utilized.

6. In a noise reduction system, a method for estimating noise for cancellation purposes comprising the steps of separating noise signal samples into frames, aggregating the frames into segments when adjoining frames are similar, and using one segment at a time as representative of noise during speech, wherein the first segment after speech is solely utilized for noise estimation.

7. In a noise reduction system, a method for estimating noise for cancellation purposes comprising the steps of separating noise signal samples into frames, aggregating the frames into segments when adjoining frames are similar, using one segment at a time as representative of noise during speech, comparing the last segment prior to speech with the first segment after speech, and utilizing only the first segment for noise estimation purposes if the first segment is sufficiently different from the last segment.

8. In a noise reduction system, a method for estimating background noise, comprising the steps of classifying input frames as either speech or noise, identifying a segment of consistent frames of noise immediately preceding a speech signal, identifying a second segment of consistent noise frames immediately following a speech signal, comparing the first segment with the second segment, and if different, utilizing only the second segment as representative of background noise.

9. In a noise reduction system, a method for estimating background noise, comprising the steps of classifying input frames as either speech or noise, identifying a segment of frames of noise immediately preceding a series of speech frames as belonging to a first class, identifying a second segment of noise frames immediately following a series of speech frames as belonging to a second class, and utilizing only the second class as representative of background noise.

10. In a noise reduction system, a method for estimating background noise, comprising the steps of classifying input frames as either speech or noise, grouping a pre-determined number of similar adjacent frames into segments, identifying a first segment of noise immediately preceding the first speech frames, identifying a second segment of noise immediately following the first speech frames, comparing the first segment with the second segment, and if similar, utilizing each noise frame sequentially to update the noise estimator.

11. In a noise reduction system, a method for estimating background noise comprising the steps of classifying input frames as either speech or noise, grouping a pre-determined number of similar adjacent frames into segments, identifying a first segment of noise immediately preceding the first speech frames, identifying a second segment of noise immediately following the first speech frames, comparing the first segment with the second segment, and if the first segment is of significantly less energy than the second segment, utilizing only the second segment to update the noise estimator.

12. In a noise reduction system, a method for estimating background noise, comprising the steps of classifying input frames as either speech or noise, grouping a pre-determined number of similar adjacent frames into segments, identifying the first segment of noise immediately preceding the first speech frames, identifying a second segment of noise immediately following the first speech frames, comparing the first segment with the second segment, and if the first segment is not of significantly less energy than the second segment, utilizing each noise frame sequentially to update the noise estimator.

13. A noise reduction system comprising a framer for segregating an input signal into frames, a noise classifier associated with the framer for determining whether a frame represents noise or speech, and if at least three frames of contiguous noise frames of similar energy levels are detected, separating the frames into segments, a supervisory controller associated with the classifier for determining which segments are representative of noise during speech, a noise estimator for estimating noise based on the frames designated by the controller, and a noise canceller for receiving estimates from the estimator and subtracting those estimates from the signal.

14. The system of claim 13 further comprising storage means for storing the signal and inputting the stored signal into the canceller when directed by the controller.

15. The system of claim 13 further comprising storage means associated with the estimator for storing estimates of segments in locations representative of the classification of the segment as being either representative of noise during speech or otherwise, for retrieving a stored estimate for processing by the estimator with another segment of the same classification, for sending the updated estimate to the canceller when directed by the controller, and for storing the updated estimate in the appropriate location.

16. A speech/noise classifier comprising a speech/noise detector for classifying incoming frames as speech or noise, means for grouping adjacent frames of noise, if they have similar characteristics, into segments, and means for classifying each segment as representative of the same class as a prior segment with similar characteristics.

17. A method for classifying noise comprising grouping adjacent frames of noise, if they have similar characteristics, into segments, and relating a segment to other segments having similar characteristics.

18. A controller for a noise reduction system comprising means for identifying a first segment of noise as immediately preceding speech, means for identifying a second segment of noise as immediately following speech, and means for comparing the first segment with the second segment.

19. The controller of claim 18 further comprising means for instructing a noise estimator to compute a new noise estimate based only upon a designated segment.

20. The controller of claim 18 further comprising means for instructing a noise canceller to access a stored signal for noise cancellation purposes in response to the comparison of the first segment with the second segment.

21. A method for controlling a noise reduction system comprising the steps of identifying a first segment of noise as immediately preceding speech, identifying a second segment of noise as immediately following speech, and comparing the first segment with the second segment.

22. The method of claim 21 further comprising the step of instructing a noise estimator to compute a new noise estimate based only upon a designated segment.

23. The method of claim 21 further comprising the step of instructing a noise canceller to access a stored signal for noise cancellation purposes in response to the comparison of the first segment with the second segment.

24. A controller for a noise reduction system comprising means for identifying a first segment of noise preceding speech, the segment being determined by identifying a group of adjacent frames, each of which has similar characteristics to the other frames in the segment, means for identifying a second segment of noise preceding speech, and means for comparing the first segment with the second segment.

25. The controller of claim 24 further comprising means for instructing a noise estimator to compute a new noise estimate based only upon the first segment in response to the comparison.

26. The controller of claim 24 further comprising means for instructing a noise estimator to compute a new noise estimate based only upon the second segment in response to the comparison.

27. The controller of claim 24 further comprising means for instructing a noise canceller to access a stored signal for noise cancellation purposes in response to the comparison.

28. A method for controlling a noise reduction system comprising the steps of identifying a first segment of noise preceding speech, the segment being determined by identifying a group of adjacent frames, each of which has similar characteristics to the other frames in the segment, identifying a second segment of noise preceding speech, and comparing the first segment with the second segment.

29. The method of claim 28 further comprising the step of instructing a noise estimator to compute a new noise estimate based only upon a designated one of the segments.

30. The method of claim 28 further comprising the step of instructing a noise canceller to access a stored signal for noise cancellation purposes in response to the comparison.

* * * * *